US012630716B2

(12) United States Patent
Hoekman

(10) Patent No.: US 12,630,716 B2
(45) Date of Patent: May 19, 2026

(54) FORMULATION COMPRISING CARNAUBA WAX AND AT LEAST ONE PARTICULAR SORBITAN MONOESTER

(71) Applicant: ARKEMA FRANCE, Colombes (FR)

(72) Inventor: Leendert Hoekman, Vlissingenoost (NL)

(73) Assignee: ARKEMA FRANCE, Colombes (FR)

( * ) Notice: Subject to any disclaimer, the term of this patent is extended or adjusted under 35 U.S.C. 154(b) by 233 days.

(21) Appl. No.: 17/785,083

(22) PCT Filed: Dec. 18, 2020

(86) PCT No.: PCT/EP2020/087041
§ 371 (c)(1),
(2) Date: Jun. 14, 2022

(87) PCT Pub. No.: WO2021/123182
PCT Pub. Date: Jun. 24, 2021

(65) Prior Publication Data
US 2023/0017487 A1     Jan. 19, 2023

(30) Foreign Application Priority Data

Dec. 20, 2019     (FR) ...................................... 1915083

(51) Int. Cl.
| | |
|---|---|
| *C08L 91/00* | (2006.01) |
| *C03C 17/32* | (2006.01) |
| *C03C 17/42* | (2006.01) |
| *C08L 91/06* | (2006.01) |
| *C09D 191/06* | (2006.01) |

(52) U.S. Cl.
CPC .............. *C08L 91/06* (2013.01); *C03C 17/32* (2013.01); *C03C 17/42* (2013.01); *C09D 191/06* (2013.01); *C03C 2217/78* (2013.01); *C03C 2218/112* (2013.01); *C03C 2218/114* (2013.01); *C03C 2218/152* (2013.01)

(58) Field of Classification Search
CPC ..... C08L 91/06; C03C 17/42; C03C 2217/78; C03C 2218/112; C03C 2218/114; C03C 2218/152; C09D 191/06

USPC ......................................................... 106/270
See application file for complete search history.

(56) References Cited

U.S. PATENT DOCUMENTS

| | | | |
|---|---|---|---|
| 3,438,797 A | | 4/1969 | Biddle, Sr. |
| 4,603,067 A | * | 7/1986 | Tani .......................... C08K 5/09 |
| | | | 428/440 |

OTHER PUBLICATIONS

Souza et al., Topical Formulation Conatining Beeswax-Based Nanoparticles Improved In Vivo Skin Barrier Function, AAPS PharmSciTerch, Vo. 8, No. 7, Oct. 2017, pp. 2505-2516. (Year: 2017).*
ISA/EP; International Search Report and Written Opinion for International Patent Application No. PCT/EP2020/087041 dated Feb. 10, 2021, 10 pages.
Villalobos-Hernández, et al., "Novel nanoparticulate carrier systems based on carnauba wax and decyloleate for the dispersion of inorganic sunscreens in aqueous media", Elsevier, European Journal of Pharmaceutics and Biopharmaceutics, vol. 60. No. 1, May 1, 2005, 10 pages.
Souza, Carla, et al., "Topical Formulation Containing Beeswax-Based Nanoparticles Improved in Vivo Skin Barrier Function", AAPS Pharmscitech, vol. 18, No. 7, Feb. 17, 2017, 12 pages.
Madureira, Ana Raquel, et al., "Characterization of solid lipid nanoparticles produced with carnauba wax for rosmarinic acid oral delivery", RSC Advances, vol. 5, No. 29, Jan. 1, 2015, 10 pages.
Finke, Jan Henrik, et al., "Controlling solid lipid nanoparticle adhesion by polyelectrolyte multilayer surface modifications", International Jouranl of Pharmaceutics, Elsevier, vol. 449, No. 1, Apr. 13, 2013, 13 pages.

* cited by examiner

*Primary Examiner* — James E McDonough
(74) *Attorney, Agent, or Firm* — Rimon P.C.; Allyn B. Elliott

(57)     ABSTRACT

The present invention deals with a formulation comprising at least one ethoxylated $C_{13}$-$C_{19}$ sorbitan monoester, saturated or not; and carnauba wax. Furthermore, the present invention pertains to a coating dilution comprising said formulation and the use of the formulation or of the coating dilution as a cold-end coating on a glass-container.

15 Claims, No Drawings

FORMULATION COMPRISING CARNAUBA WAX AND AT LEAST ONE PARTICULAR SORBITAN MONOESTER

CROSS-REFERENCE TO RELATED APPLICATIONS

This application is a U.S. National Stage application of International Patent Application No. PCT/EP2020/087041, filed on Dec. 18, 2020, which claims the benefit of French Patent Application No. FR1915083, filed on Dec. 20, 2019.

FIELD OF THE INVENTION

The present invention relates to a formulation for glass container. The present invention also relates to a coating dilution comprising said formulation and its use as a cold-end coating on a glass container.

Technical Problem

Hollow glass containers are produced from molten glass at molds at high temperatures. As the surface of these containers is fragile and in order to preserve the strength of the glass and to prevent any direct glass to glass contact of the respective containers in order to avoid damage, they are surface coated directly after forming of the container.

Indeed, in the industry of glass containers, for example glass packaging containers, coatings are applied to improve and maintain their quality. Without coating, the glass articles can be easily damaged already during the manufacturing process, and this affects the appearance and weakens the glass articles.

Such a coating includes tin or titanium or other heat decomposable metallic or organometallic based compounds. This is the basis of the coating needed for protection of the glass container surface from damage such as abrasions and scratches, which result in a loss of strength for the glass container. The need for high tensile strength in a glass container is particularly acute when containers are mass produced, move rapidly in close proximity along high speed conveyor lines.

Nowadays, in glass container manufacturing, a two-step coating process is implemented in order to obtain scratch resistance and slipperiness of the glass containers. So, the glass containers typically receive two surface coatings, one at the hot end, just before annealing and one at the cold end just after annealing.

In the first step, the so-called hot-end coating (HEC) is applied by means of chemical vapor deposition (CVD) of a metal containing compound on the freshly formed, hot, and single or double line positioned glass containers. This first step is normally carried out at a temperature ranging from 450° C. to 650° C. and conduct to a thin layer of metal oxide.

In a second step, the so-called cold end coating (CEC) is applied, usually by spraying means, in form of an aqueous dispersion, when the glass containers have cooled down to a temperature approximately around 100° C. Usually, partly oxidized polyethylene (PE) wax dispersions are applied. With this additional coating on glass containers surface, a long-lasting protection is provided, consisting in scratch resistance and prevention of scuffing of glass surfaces during filling and transportation.

Nowadays, when applying the CEC, it is common to use in an autoclave process said partly oxidized PE wax dispersions. These dispersions are dispersed in water by aid of a suitable surfactant. When done at optimum conditions, a fine dispersion of said wax is obtained. Depending on the type of surfactant, non-ionic or ionic type of dispersion is obtained. Non-ionic type surfactant is commonly used, often ethoxylated alcohols, to minimize effect of pH and hardness of the water used for preparing the final dilution for application.

During the application, which is done by spraying an aqueous dilution of a wax, as mentioned above, it cannot be completely excluded that material can enter the glass container. Although risk for humans is small, this situation is clearly preferably to avoid and is unwanted.

Especially, these common formulations generally contain nano particles. On a European level, a nano particle is clearly defined. A nano particle is «a natural, incidental or manufactured material containing particles, in an unbound state or as an aggregate or as an agglomerate and where, for 50% or more of the particles in the number size distribution, one or more external dimensions is in the size range from 1 nm to 100 nm».

However, the presence of nano particles in these formulations currently raises several issues, in particular in terms of their health impact. Indeed, these substances can migrate into the body because the skin is not impervious, especially when it is damaged. Nanoparticles could cross the skin barrier and may then cause disease in humans. Furthermore, the potential risk for humans may be higher during the application of these common formulations since they are usually applied thanks to aerosols. Said aerosols containing nanoparticles can be spread and then inhaled by humans.

Furthermore, these common formulations generally contain plastics or micro plastics, namely materials, or micro materials, composed from one or more synthetic polymers. In the context of global environmental issues, it is preferable to limit or even to avoid their use.

As such, these common formulations may present health hazards, may present dangers for human health.

Therefore, there is a need to have formulations, in the industry of glass containers, that pose less risk to human health.

An objective of the invention is to overcome the drawbacks linked to the formulations as mentioned above.

In particular, an objective of the present invention is to provide formulations with limited health risk.

In particular, an objective of the present invention is to provide formulations that do not contain nanoparticles.

DESCRIPTION OF THE INVENTION

Surprisingly, it has been discovered that a formulation, comprising at least a particular sorbitan monoester and a particular wax, could have particles where, for 50 or more of the particles in the number size distribution, the size is of above 100 nm.

The object of the invention is a formulation comprising:
  at least one ethoxylated $C_{13}$-$C_{19}$ sorbitan monoester, saturated or not; and
  carnauba wax.

Another object of the present invention is a coating dilution comprising the formulation according to the invention.

Still another object of the present invention is a coating process comprising at least a step of applying the formulation according to the invention or the coating dilution according to the invention to a glass surface.

By saying that a range is from x to y in the present invention, it is meant that the upper and lower limit of this range are included, equivalent to at least x and up to y.

By saying that a range is between x and y in the present invention, it is meant that the upper and lower limit of this range are excluded, equivalent to more than or above x and less than or below y.

As mentioned above, the formulation according to the present invention comprises at least one ethoxylated $C_{13}$-$C_{19}$ sorbitan monoester, saturated or not, and carnauba wax.

Preferentially, the formulation has at least 50%, preferably at least 60%, more preferably at least 70%, more preferably at least 80%, and even more preferably at least 90% of the particle having a size, based on number distribution, above 100 nanometers, preferably comprised between 100 nanometers and 300 nanometers, more preferably comprised between 100 nanometers and 200 nanometers.

As used herein and as generally defined, "Q0, 50" designates the value at which 50% of the particles have a size above said value, based on number distribution. This value is determined based on measurements made by Photon Cross-correlation Spectroscopy on Nanophox®. The Photon Cross-correlation Spectroscopy is a technique allowing for the simultaneous measurement of particle size and stability of opaque suspension or emulsions of nano-particles in the size range of about 1 nm to some μm.

The formulation can comprise from 5 to 25 wt %, preferably from 10 to 25 wt %, more preferably from 11 to 25 wt %, more preferably from 10 to 20 wt %, more preferably from 11 to 20 wt % of carnauba wax relative to the total formulation weight. Even more preferably, the formulation comprises from 10 to 15 wt %, and even more preferably comprises from 11 to 15 wt % of carnauba wax relative to the total formulation weight.

Preferably, the formulation of the invention comprises more than 60 wt % of carnauba wax relative to the total wax weight, more preferably more than 70 wt %, more preferably more than 80% wt %, more preferably more than 90 wt %, and even more preferably more than 99 wt %, relative to the total wax weight. In a particularly preferred embodiment, the carnauba wax is the only wax of the formulation.

By the term "wax" it is meant an organic compound that comprises long alkyl chains, having a melting above 45° C.

As mentioned above, the formulation according to the present invention comprises at least one ethoxylated $C_{13}$-$C_{19}$ sorbitan monoester.

Preferably, the formulation comprises between more than 1 and less than 8.5 wt %, preferably between more than 2 and less than 7 wt %, more preferably from 2.5 to 5.5 wt % of said ethoxylated $C_{13}$-$C_{19}$ sorbitan monoester relative to the total formulation weight. Even more preferably, the formulation comprises from 2.5 to 4.2 wt % of said ethoxylated $C_{13}$-$C_{19}$ sorbitan monoester relative to the total formulation weight.

According to one embodiment, the total weight of carnauba wax and ethoxylated $C_{13}$-$C_{19}$ sorbitan monoester is between more than 6 and less than 35 wt %, preferably from 10 to less than 35 wt %, more preferably from 12 to 35 wt %, more preferably from 12 to 27 wt %, even more preferably from 12 to 20 wt %, relative to the total formulation weight.

According to one particular embodiment, the formulation comprises from 10 to 15 wt % of carnauba wax relative to the total formulation weight, from 2.5 to 5.5 wt % of said ethoxylated $C_{13}$-$C_{19}$ sorbitan monoester relative to the total formulation weight, and wherein the total weight of carnauba wax and ethoxylated $C_{13}$-$C_{19}$ sorbitan monoester is from 12 to 20 wt %, relative to the total formulation weight.

Advantageously, the weight ratio R, defined by the ratio between the percentage in weight of carnauba wax and the percentage in weight of ethoxylated $C_{13}$-$C_{19}$ sorbitan monoester is from 2.5 to 5, preferably from 2.9 to 4.8.

Preferably, the at least ethoxylated $C_{13}$-$C_{19}$ sorbitan monoester has a hydrophile-lipophile balance (HLB) from 13 to 17, preferably from 14 to 16.

Advantageously, the at least ethoxylated $C_{13}$-$C_{19}$ sorbitan monoester comprises more than 5 ethylene oxide groups, preferably from 10 to 40 ethylene oxide groups.

According to one particular embodiment of the present invention, the at least ethoxylated $C_{13}$-$C_{19}$ sorbitan monoester is chosen from the group consisting of sorbitan monostearate, sorbitan monopalmitate and sorbitan monooleate, more preferably is sorbitan monopalmitate.

Preferentially, the formulation comprises one or more additional additives, preferably chosen in the group consisting of biocides, bactericides, preservatives, ester alcohol, glycol ether, dyes, emulsion destabilizers, perfumes, odorants, UV absorbers, light absorbers, impact absorbers, surfactants other than sorbitan esters, oils other than mineral oils and the like.

Preferentially, the formulation may contain water in an amount ranging from 65 wt % to 94 wt %, relative to the total weight of the formulation.

Preferentially, the formulation does not contain ethoxylated sorbitan monolaurate, especially polyoxyethylene sorbitan monolaurate having more than 5 ethylene oxide groups, preferably from 10 to 40 ethylene oxide groups, more preferably 20 ethylene oxide groups.

In a particular embodiment, the formulation consists of:
at least one ethoxylated $C_{13}$-$C_{19}$ sorbitan monoester, saturated or not as defined above;
carnauba wax as defined above, and
water.

Another object of the present invention is a manufacturing process of the formulation comprising a step of mixing carnauba wax and ethoxylated $C_{13}$-$C_{19}$ sorbitan monoester, as described above. Preferentially, the manufacturing process comprises a step of mixing carnauba wax, ethoxylated $C_{13}$-$C_{19}$ sorbitan monoester and water.

Another object of the present invention is the use of the formulation according to the invention for the preparation of a coating dilution.

Still another object of the present invention is a coating dilution comprising the formulation according to the invention.

According to one embodiment, the coating dilution comprises from 0.5 to 10 wt % of the formulation according to the invention relative to the total weight of the coating dilution.

Said coating dilution may be then applied to a glass article, for example a glass container.

Another object of the present invention is the use of the formulation according to the invention or of the coating dilution according to the invention, as a cold-end coating on a glass surface.

Another object of the present invention is a process comprising at least a step a) of applying the formulation according to the invention or the coating dilution according to the invention to a glass surface.

Said step a) can be made by contact between said formulation or said coating dilution and the glass surface with a coating application method. Said method can be spraying or dipping or by using a coating applicator.

Preferably, said step a) is implemented on a glass surface at a temperature ranging from 80 to 150° C.

Advantageously, means for applying said formulation or said coating dilution to a glass surface by spraying comprise spraying means.

According to one embodiment, means for applying said formulation or said coating dilution to a glass surface by dipping comprise a recipient containing said formulation or said coating dilution in which the containers are dipped.

The coating applicator can be a brush, capillary, sponge, fibre or the like. The coating material is applied on the surface of the glass article via the contact area between the coating applicator and the glass article surface.

Preferably, the coating process is for coating a glass container, and the coating process further comprises a previous step a') of applying a metal oxide treatment to the glass surface.

Advantageously, the metal is chosen from tin and titanium.

Another object of the present invention is a glass surface obtainable by the coating process according to the invention.

Surfaline® OX® 1307L (Oxo C13 alcohol ethoxylates) is used, having an HLB of 12.1. Hereafter, Surfaline® OX 1307L is called (S13).

Tween 40, Tween 60, Tween 80, Surfaline® OX 1307L, Tween 65 and Tween 85 are different surfactants.

Example 1

Several aqueous dispersions involving the abovementioned products are prepared according to the general following procedure. Carnauba wax, the surfactant and a first portion (80 g) of water are mixed. The mixture is then stirred and heated up to 95° C. The mixture is then held for 15 minutes. Next, the mixture is quickly cooled down in ice-water. Once the temperature is below 70° C., a second portion (40 g) of water is added.

Several formulations are prepared according to the table 1 below. The contents are expressed in weight percentage.

TABLE 1

| Formulation | 1 | 2 | 3 | 4 | 5 | 6 | 7 |
|---|---|---|---|---|---|---|---|
| CW | 11.7 | 11.8 | 11.7 | 11.8 | 11.7 | 11.7 | 11.7 |
| T40 | 3.2 | 2.5 | — | — | — | — | — |
| T60 | — | — | 3.2 | 2.5 | — | — | — |
| T80 | — | — | — | — | 3.2 | 2.8 | — |
| S13 | — | — | — | — | — | — | 3.2 |
| Water | Qsp 100 | Qsp 100 | Qsp 100 | Qsp 100 | Qsp 100 | Qsp 100 | Qsp 100 |

Preferably the glass surface is a glass container, more preferably, a glass bottle.

Method of Evaluation

The size of the particle has been measured by Photon Cross-correlation Spectroscopy on Nanophox® The Photon Cross-correlation Spectroscopy is a technique allowing for the simultaneous measurement of particle size and stability of opaque suspension or emulsions of nano-particles in the size range of about 1 nm to some μm.

EXAMPLES

Carnauba wax is used, having a melting point (range) from 82 to 86° C. and having an acid number from 2 to 10 mg KOH/g. Hereafter, carnauba wax is called (CW).

Candelilla wax is used having a melting point (range) from 69 to 73° C. and having an acid number from 12 to 22 mg KOH/g.

Sunflower seed wax is used having a melting point (range) from 74 to 78° C. and having an acid number from 17 to 22 mg KOH/g.

PE wax PED 521 is used having a melting point of 105° C. and having an acid number from 5 to 25 mg KOH/g.

Tween 40 (polyoxyethylene sorbitan monopalmitate) is used, having an HLB of 15.6. Hereafter, Tween 40 is called (T40).

Tween 60 (polyoxyethylene sorbitan monostearate) is used, having an HLB of 14.9. Hereafter, Tween 60 is called (T60).

Tween 80 (polyoxyethylene sorbitan monooleate) is used, having an HLB of 15.0. Hereafter, Tween 80 is called (T80).

Tween 65 (polyoxyethylene sorbitan tristearate) is used, having an HLB of 10.5. Hereafter, Tween 65 is called (T65).

Tween 85 (polyoxyethylene sorbitan trioleate) is used, having an HLB of 10.5. Hereafter, Tween 85 is called (T85).

PEG 40 stearate (polyoxyethylene (40) stearate) is used having an HLB of 17.5.

The size of the particles present in the formulations obtained has been measured. The results are presented in the table 2 below thanks to "Q0, 50" value, expressed in nm.

"Q0, 50" designates the value at which 50% of the particles have a size above said value, based on number distribution, as previously described.

TABLE 2

| Formulation | 1 | 2 | 3 | 4 | 5 | 6 | 7 |
|---|---|---|---|---|---|---|---|
| Q0, 50 (nm) | 132 | 181 | 128 | 170 | 131 | 140 | 58 |

It is clearly observed that the formulations according to the invention have a "Q0, 50" above 100 nm, whereas the formulation according to the prior art has a "Q0, 50" below 100 nm.

Example 2

Some other formulations are prepared according to the table 3 below. The contents are expressed in weight percentage.

TABLE 3

| Formulation | 8 | 9 | 10 | 10 | 11 | 12 |
|---|---|---|---|---|---|---|
| CW | 20 | 20 | 20 | 25 | 25 | 25 |
| T40 | 4.2 | 5.5 | 6.7 | 5.3 | 6.8 | 8.3 |
| Water | Qsp 100 | Qsp 100 | Qsp 100 | Qsp 100 | Qsp 100 | Qsp 100 |

The size of the particles presents in the formulation obtained has been measured. The results are presented in the table 4 below thanks to "Q0, 50" value, expressed in nm.

TABLE 4

| Formulation | 8 | 9 | 10 | 11 | 12 | 13 |
|---|---|---|---|---|---|---|
| Q0, 50 (nm) | 194 | 149 | 121 | 192 | 161 | 132 |

It is clearly observed that the formulations according to the invention have a "Q0, 50" above 100 nm.

Furthermore, coating dilutions comprising formulations have been prepared. Then the coating dilutions have been applied to a glass surface. The scratch resistance has been tested. It has been found that the scratch resistance was comparable to a standard CEC formulation. This means that the coating dilution of the present invention, used as a cold end coating, is efficient.

Example 3—Comparative Formulations

Formulations A and B are prepared according to table 5 below according to the protocol detailed in example 1. The contents are expressed in weight percentage.

TABLE 5

| Formulation | A | B |
|---|---|---|
| Candelilla wax | 11.9 | — |
| Sunflower seed wax | — | 11.9 |
| PE wax | — | — |
| T40 | 3.9 | 3.9 |
| Water | Qsp 100 | Qsp 100 |

No stable suspension could be obtained with both formulations A and B and therefore no assessment of the particles size could be achieved.

Example 4—Comparative Formulation

Formulation C is prepared according to table 6 below. The contents are expressed in weight percentage.

TABLE 6

| Formulation | C |
|---|---|
| PE wax | 11.6 |
| T40 | 3.9 |
| KOH | 0.5 |
| Water | Qsp 100 |

No stable suspension could be obtained with formulation C and therefore no assessment of the particles size could be achieved.

Example 5—Comparative Formulations

Formulations D, E and F are prepared according to table 7 below according to the protocol detailed in example 1. The contents are expressed in weight percentage.

TABLE 7

| Formulation | D | E | F |
|---|---|---|---|
| Carnauba wax | 11.6 | 11.6 | 11.6 |
| TW65 | 3.9 | — | — |
| PEG-40 stearate | — | 3.9 | — |

TABLE 7-continued

| Formulation | D | E | F |
|---|---|---|---|
| TW85 | — | — | 3.9 |
| Water | Qsp 100 | Qsp 100 | Qsp 100 |

No stable suspension could be obtained with formulations D, E and F and therefore no assessment of the particles size could be achieved.

The invention claimed is:

1. A formulation comprising:
   between 2.5 wt % and less than 8.5 wt % of at least one ethoxylated C13-C19 sorbitan monoester, saturated or not, relative to a total formulation weight;
   carnauba wax, and
   particles, wherein in a number-based particle size distribution of the particles of the formulation, at least 50% of the particles have a size greater than 100 nanometers according to the number-based distribution analysis method.

2. The formulation according to claim 1, comprising from 11 to 25 wt % of carnauba wax relative to the total formulation weight.

3. The formulation according to claim 1, wherein a total weight of the carnauba wax and the at least one ethoxylated C13-C19 sorbitan monoester is between more than 12 and less than 35 wt %, relative to the total formulation weight.

4. The formulation according to claim 1, wherein a weight ratio R, defined by a ratio between a percentage in weight of the carnauba wax and a percentage in weight of the at least one ethoxylated C13-C19 sorbitan monoester is from 2.5 to 5.

5. The formulation according to claim 1, wherein the at least one ethoxylated C13-C19 sorbitan monoester has a hydrophile-lipophile balance from 13 to 17.

6. The formulation according to claim 1, wherein the at least one ethoxylated C13-C19 sorbitan monoester comprises more than 5 ethylene oxide groups.

7. The formulation according to claim 1, wherein the at least one ethoxylated C13-C19 sorbitan monoester is selected from the group consisting of sorbitan monostearate, sorbitan monopalmitate and sorbitan monooleate.

8. The formulation according to claim 1, further comprising one or more additional additives selected from the group consisting of biocides, bactericides, preservatives, ester alcohol, glycol ether, dyes, emulsion destabilizers, perfumes, odorants, UY absorbers, light absorbers, impact absorbers, surfactants other than sorbitan esters, oils other than mineral oils and the like.

9. The formulation according to claim 1, comprising more than 60 wt % of the carnauba wax relative to a total wax weight.

10. A coating dilution comprising the formulation according to claim 1.

11. The coating dilution according to claim 10, comprising from 0.5 to 10 wt % of the formulation relative to a total weight of the coating dilution.

12. A cold-end coating on a glass surface comprising the formulation according to claim 1.

13. Coating process comprising at least a step a) of applying the formulation according to claim 1 to a glass surface.

14. The coating process of claim 13, further comprising a previous step a') of applying a metal oxide treatment to the glass surface.

15. Glass surface obtainable by the process of claim 13.

* * * * *